(12) United States Patent
Makati et al.

(10) Patent No.: US 10,812,990 B2
(45) Date of Patent: Oct. 20, 2020

(54) CLIENT STEERING

(71) Applicant: Cable Television Laboratories, Inc., Louisville, CO (US)

(72) Inventors: Mufaddal Makati, Broomfield, CO (US); John C. Bahr, Superior, CO (US); Kevin E. Mahoney, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 24 days.

(21) Appl. No.: 15/878,337

(22) Filed: Jan. 23, 2018

(65) Prior Publication Data

US 2018/0213412 A1 Jul. 26, 2018

Related U.S. Application Data

(60) Provisional application No. 62/449,391, filed on Jan. 23, 2017.

(51) Int. Cl.
*H04W 8/02* (2009.01)
*H04W 16/28* (2009.01)
*H04W 16/26* (2009.01)
*H04W 36/00* (2009.01)
*H04W 88/08* (2009.01)
*H04W 84/12* (2009.01)

(52) U.S. Cl.
CPC .......... *H04W 16/28* (2013.01); *H04W 16/26* (2013.01); *H04W 36/00837* (2018.08); *H04W 84/12* (2013.01); *H04W 88/08* (2013.01)

(58) Field of Classification Search
CPC ..... H04W 16/28; H04W 16/26; H04W 36/00; H04W 48/18; H04L 43/16
See application file for complete search history.

(56) References Cited

U.S. PATENT DOCUMENTS

| | | | |
|---|---|---|---|
| 2010/0248715 A1* | 9/2010 | Lundsgaard | H04W 48/16 455/432.1 |
| 2013/0036188 A1* | 2/2013 | Ganu | H04W 48/02 709/217 |
| 2014/0059218 A1* | 2/2014 | Ganu | H04W 12/08 709/224 |
| 2015/0172957 A1* | 6/2015 | Sarawat | H04W 48/06 370/235 |
| 2015/0237554 A1* | 8/2015 | Craig | H04W 36/18 370/332 |
| 2015/0271829 A1* | 9/2015 | Amini | H04W 24/02 370/329 |
| 2016/0073316 A1* | 3/2016 | Calcev | H04W 36/30 370/332 |
| 2017/0332292 A1* | 11/2017 | Ponnuswamy | H04L 43/16 |
| 2017/0374602 A1* | 12/2017 | Gokturk | H04W 48/18 |
| 2018/0176284 A1* | 6/2018 | Strater | H04L 67/04 |
| 2018/0206184 A1* | 7/2018 | Bahr | H04W 48/20 |

* cited by examiner

*Primary Examiner* — Brandon M Renner
(74) *Attorney, Agent, or Firm* — Great Lakes Intellectual Property, PLLC

(57) ABSTRACT

Steering clients between access points (APs) or other sources of wireless signaling is contemplated. The client steering may be used to supplant or augment roaming capabilities of the clients with independent steering decisions made at the APs such as by utilizing information shared between the APs to generate a steering threshold for use in assessing whether clients should be steered from one AP to another.

18 Claims, 3 Drawing Sheets

CLIENT STEERING

CROSS-REFERENCE TO RELATED APPLICATIONS

This application claims the benefit of U.S. provisional application No. 62/449,391 filed Jan. 23, 2017, the disclosure of which is incorporated in its entirety by reference herein.

TECHNICAL FIELD

The present invention relates to steering clients between access points (APs) or other sources of wireless signaling, such as but not necessarily limited to supplanting or augmenting roaming capabilities of the clients with independent steering decisions made at the APs.

BACKGROUND

Providing subscribers with reliable Wi-Fi coverage and capacity in a medium to large sized home or other location using a single Access Point (AP) can become challenging when an associated Wi-Fi network experiences dead zones having little or no connectivity. The dead zones may occur at fringe areas in the home located at wireless signaling range limits of the AP and/or other areas receiving intermittent or insufficient wireless signals due to shielding, interferences or other influences. One contemplated solution to this problem includes deploying multiple APs at strategic positions throughout the home to coordinate their wireless service areas in a manner designed to provide wireless coverage sufficient to eliminate dead zones and/or to otherwise assure sufficient wireless service throughout the Wi-Fi network. In order to properly take advantage of an environment having multiple APs, clients, stations (STAs) or other subscriber devices being used to access the Wi-Fi network in such an environment may be required to switch between the access points, such as when moving beyond a desired signaling range of a connected to one of the APs, i.e., switch to another AP prior to reaching the dead zone or other poor performance limitation of the connected to one of the APs.

Clients may switch from one AP to another AP in a roaming operation where a client disassociates from one AP and associates with another AP. The capabilities of clients to instigate roaming decisions may allow clients to make decisions locally based on information, measurements, metrics and other data as seen from the client perspective, e.g., clients can look at available APs and decide the one they believe will most likely service its needs in a desired manner. One problem with roaming operations being implemented according to such client-based or client-centric decisions is that clients lack an overall view of the Wi-Fi environment, particularly when multiple APs may be coordinating to facilitate coverage for a home or other entity. The inability of clients to see an entirety of the Wi-Fi environment, and/or to appreciate activities of multiple APs and the clients connected thereto, can result in lower overall performance of the Wi-Fi network, especially when the clients make decisions that are best for them as opposed to those that are best for overall performance of the Wi-Fi network. One non-limiting aspect of the present invention contemplates ameliorating the network degradations and inefficiencies associated with client-based or client-centric roaming decisions by supplanting or augmenting those decisions with a network-based or network-centric process for making decisions associated with clients switching from one AP to another.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
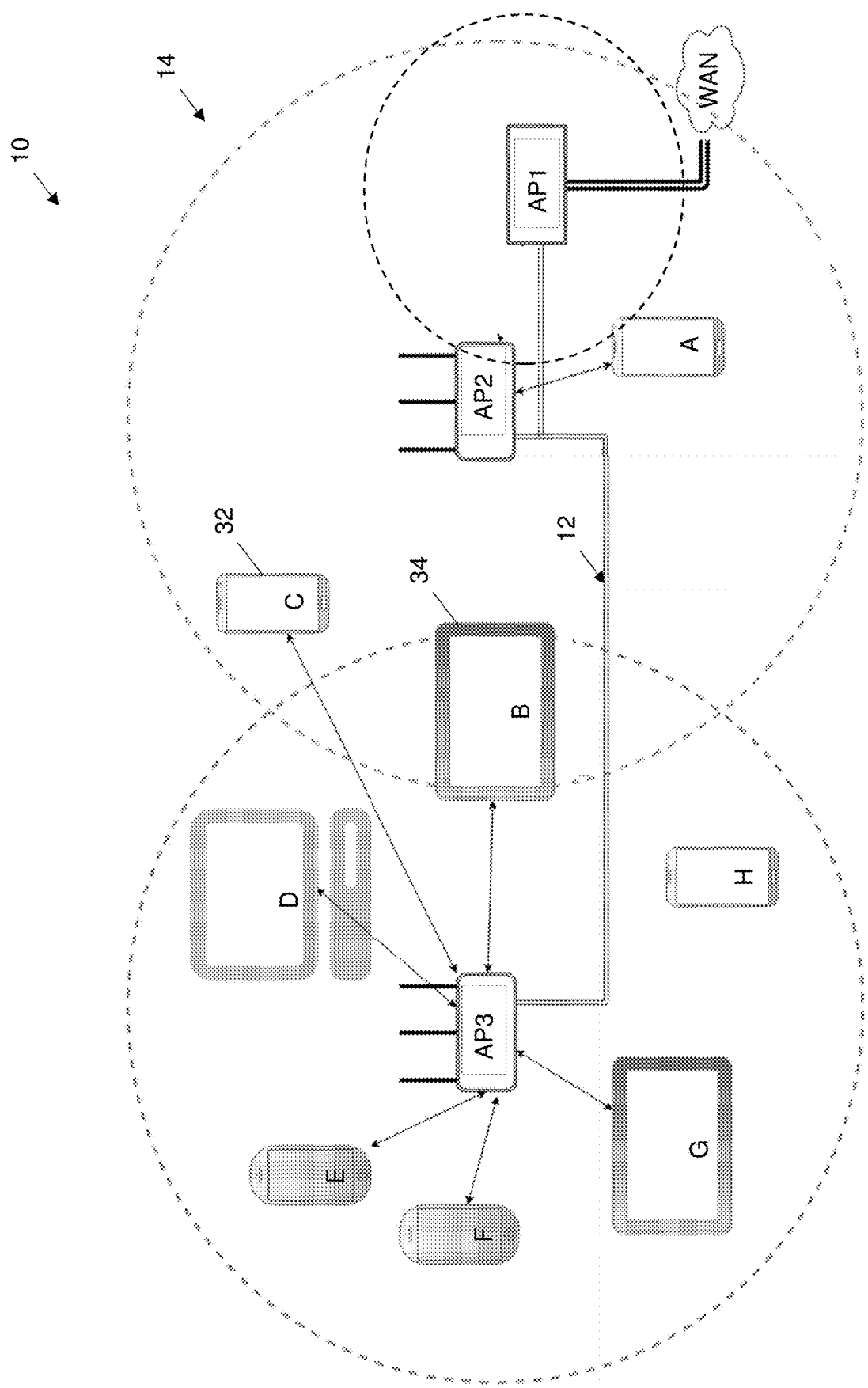
FIG. 1 illustrates a system having client steering in accordance with one non-limiting aspect of the present invention.

FIG. 1 illustrates a system 10 having client steering in accordance with one non-limiting aspect of the present invention. The system 10 may include a plurality of APs having capabilities sufficient to facilitate interfacing wireless signals with a plurality of clients. The clients, which may optionally be referred to as stations (STAs), and the APs connected or associated therewith (solid lines) may operate according to any suitable communication protocol and are predominately described for exemplary, non-limiting purposes as providing Wi-Fi signaling in accordance with Institute of Electrical and Electronics Engineers (IEEE) 802.11: Telecommunications and information exchange between systems—Local and metropolitan area networks—Specific requirements-Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. The exemplary description of the present invention may be utilized with non-Wi-Fi environments and is predominant described with respect to Wi-Fi for non-limiting purposes to demonstrate the capability of the present invention to facilitate client steering within a wireless networking environment where APs may be utilized to provide network-based or network-centric decisions associated with clients switching from one AP to another.

The system 10 is shown to include three APs operating to facilitate interfacing the clients with an external or wide area network (WAN), such as that associated with an Internet service provider (ISP) or other multiple system operator (MSO). A first AP (AP1) is shown to also be acting as a gateway (GW) with a second AP (AP2) and a third AP (AP3) are shown to be connected downstream therefrom. All data or other information/messaging intend to be interface with the clients, collectively referred to as client data, and intended for exchange over the WAN may be required to pass through the AP1 such that AP1 may be considered as the last link or hop between the WAN and the plurality of APs, i.e., any data originating with the clients for transmission to the WAN and any data originating on the WAN for transmission to the clients may pass through AP1. The wireless signaling of the APs may be utilized to facilitate exchanging client data with the clients whereupon the exchanged client data may be communicated over a first local area network (LAN) 12 established between the APs, which may be referred to as a backhaul network. The wireless signaling associated with the APs (shown with dashed circles centered at AP1, AP2 and AP3) may form a second local area network 14 over which the clients communicate with the APs such that the system 10 includes two LANs 12, 14—one 14 for communication between the APs and the clients and one 12 for communication between the APs.

The second LAN 14, i.e., the Wi-Fi or other network 14 for facilitating communications between the APs and the clients, may be entirely composed of wireless signaling associated with the APs. One non-limiting aspect of the present invention contemplates the system 10 operating in a home or other location where it may be desirable to provide a singular interface for subscribers, such as to allow subscribers to easily locate their wireless network (the second LAN 14) without having to distinguish the AP facilitating communication with the client/device the subscriber is using. The APs may enable the singular interface concept through use of the same service set ID (SSID), i.e., each AP may broadcast identical SSIDs and facilitate wireless signaling optionally over multiple bands and/or channels. The APs may be collectively part of the same extended service set (ESS) and utilize different basic service set IDs (BSSIDs) for each basic service set (BSS), e.g., each AP in the illustrated example, to enable the clients to associate with the second LAN 14 without the subscribers having to distinguish one AP from another. The first LAN 12 may be distinguished from the second LAN 14 at least in so far as the clients being unable to connect with or associate with the first LAN 12 or otherwise access signaling communicated thereover. The signaling may be carried over the first LAN 12 wirelessly and/or wiredly between the APs, e.g., part of the first LAN 12 may be wireless and another part may be wired, and/or part of the same communication medium as the second LAN 14, such as through tunneling, virtual networking, etc.

One non-limiting aspect of the present invention contemplates executing a coordination protocol amongst the APs to facilitate network optimization through steering of clients from one AP to another AP. The contemplated coordination and client steering may be executed between the APs, i.e., with APs making decisions and instructing the corresponding operations of the clients, as opposed to and optionally independently of roaming or other client-based or client-centric capabilities to facilitate associating and disassociating with other APs. The AP coordination capabilities of the present invention may be distinct and separate from individual capabilities of the clients to make 802.11 roaming decisions or other decisions associated with assessing AP suitability. Such client-based capabilities may optionally be used to augment or supplement the coordination contemplated herein and/or be completely supplanted or partially disabled or overridden in favor of relying solely upon the AP coordination to facilitate client associations and/or disassociations with the APs. The AP coordination may include the APs exchanging associated client reports (ACRs) and utilizing client information and/or other data included therein or transmitted therewith to facilitate client steering operations where clients may be individually instructed by or controlled through the APs to associate and/or disassociate from APs for purposes of addressing and optimizing network performance and optimization metrics.

Figure 2:
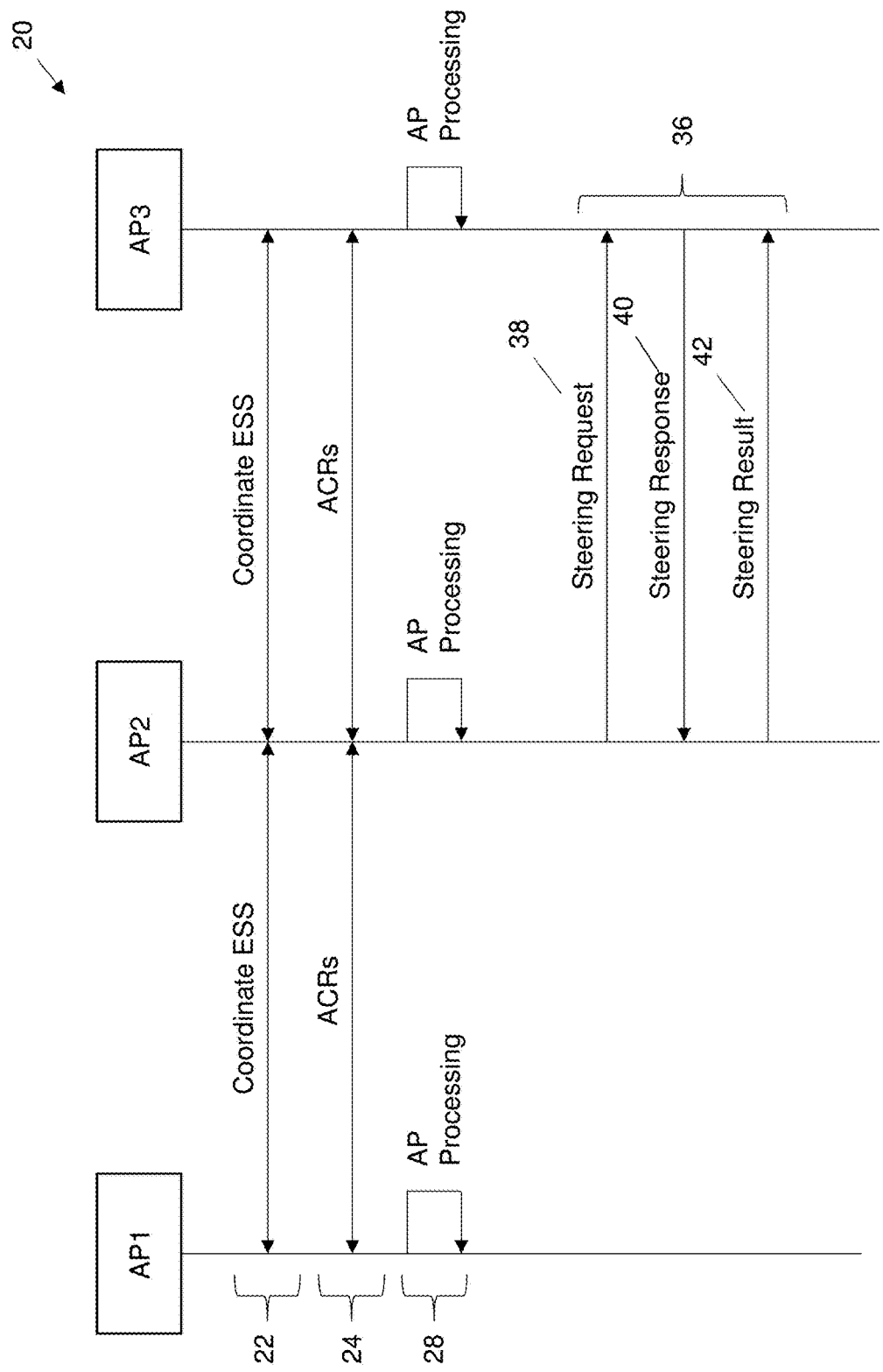
FIG. 2 illustrates a diagram of a method for AP coordination in accordance with one non-limiting aspect of the present invention.

FIG. 2 illustrates a diagram 20 of a method for AP coordination in accordance with one non-limiting aspect of the present invention. The method generally relates to the APs establishing a coordinated relationship and thereafter utilizing the coordinated relationship to facilitate AP-based steering of clients from one AP to another. The AP coordination may be distributed insofar as the APs may each include capabilities sufficient to facilitate making decisions and requesting APs and/or clients to execute in response thereto. The AP-based decision-making process may be utilized to produce network-based or network-centric steering decisions to optimize a home networking environment without having to employ a wireless local area controller (WLC), or at least without a WLC within the home or as part of or downstream of the GW. Each AP may include a non-transitory computer-readable medium having a plurality of non-transitory instructions stored thereon and executable with a processor to facilitate one or more of the operations contemplated herein. The AP coordination may commence with the APs executing a coordinate ESS process 22 where the APs may discover each other, such as through a UPnP or other suitable protocol, and thereafter establishing the first LAN 12 or otherwise perform operations sufficient to facilitate exchanging configuration, programming, variables and other information contemplated herein to facilitate steering clients, e.g., the coordinate ESS process 22 may instigate as new APs are added and/or removed from the home. The information shared between the access points as part of the coordinate ESS process 22 may include a number of configuration parameters to be utilized when the APs make decisions and other operational executions associated with establishing their respective BSSs within the Wi-Fi network.

An ACR exchange process 24 may commence after the APs have established the first LAN 12 and communicate the configuration parameters and other information associated with coordinating the activities necessary for supporting wireless services in the contemplated manner. The ACR exchange process 24 may include the APs each generating an ACR and then communicating that ACR to each of the other APs, i.e., each AP generates one ACR and shares it with each of the other APs. The ACRs may be files, XML schema, documents or other constructs sufficient for communicating information between the APs. The individual ACRs may include metrics sufficient for representing data, measurements, information, etc. associated with operations, capabilities, conditions and other settings as seen or experienced by the APs and the clients. Such metrical information originating from the APs or generated thereat may be considered as AP metrics where the same or different metrical information when originating from the clients or generated thereat may be considered as client metrics. One non-limiting aspect of the present invention contemplates differentiating between AP metrics and client metrics for purposes of facilitating the steering decision processes contemplated herein. The AP metrics may optionally be differentiated from the client metrics at least in so far as the clients are unaware of or lack access to some or all of the AP metrics due to inherent processing limitations and/or lack of visibility to the other APs and/or clients affecting the Wi-Fi network.

The lack of awareness or other limitations of the clients in processing of the AP metrics may allow the APs to make better steering decisions using information otherwise unavailable to the clients. The use of information different than that available to the clients is contemplated to result in improved steering decisions and overall Wi-Fi optimization, especially when addressing the possibility of clients making decisions that are best for them as opposed to those that are best for overall performance of the Wi-Fi network. One non-limiting aspect of the present invention contemplates utilizing AP-based steering decision in cooperation with client-based steering decisions, such as by allowing client-based steering decisions during transmission lulls or other intervals of the clients that may be difficult or impossible to accurately detect with the APs and/or when the nature of the roaming decisions may be unlikely to affect overall network performance, e.g., when network throughput is above a minimum threshold and/or the number of clients attempting to access or part of the Wi-Fi network is insignificant. Using deep packet inspection (DPI) or other suitable assessment capabilities, the APs can decide to steer clients when their network activity is low or is such that a gap in network connectivity would be unlikely to affect the client's application performance, unless the client must be steered before it loses all network connectivity. The APs may DPI, for example, to refrain from steering during a two-way video or phone call unless absolutely necessary but allow steering during one-way video viewing.

One non-limiting aspect of the present invention contemplates improving and maximizing performance by overriding or otherwise preventing the clients from executing any roaming decisions, or least roaming decisions associated with moving from one AP to another AP within the SSID. Reliance on the APs to make a totality of the steering decisions under normal operating conditions or when certain operating conditions are present may be beneficial in assuring certain network performances during identifiable periods of time, which may be beneficial in eliminating complexities associated with accommodating client-based steering decisions while attempting to manage overall network performance or otherwise bring network performance into a desired equilibrium that would otherwise be potentially affected by unanticipated or unexpected client-based decisions to switch APs. Optionally, when the steering/roaming decisions are being performed by the APs in a network-based or network-centric manner, the APs may program or otherwise prevent the clients associated therewith from roaming according to client-based roaming decisions absent a matching steering decision from one of the APs.

One non-limiting aspect of the present invention contemplates sharing the ACRs and/or other information therein according to the processes disclosed in U.S. patent application Ser. No. 15/874,383, entitled Access Point Coordination, the disclosure of which is hereby incorporated in its entirety by reference herein. The ACRs in a manner consistent with the incorporated patent application may include both AP metrics and client metrics, e.g., an AP generating one of the ACRs may include AP metrics determined thereat as well as client metrics received from or for clients within its communication range. The incorporated patent application includes a number of variables, metrics, data and other information being exchanged between the APs as well as being received from the clients. The data included therein may be differentiated according to the AP metrics and client metric demarcation noted herein to facilitate its use and application with the present invention. The formatting, transmission and other processes associated with establishing and sharing the ACRs may also be performed in a manner consistent with that described in the incorporated patent application. The ACR exchange process may occur at a high-frequency such that each of the APs essentially have the same information available to make steering decisions based on the same set of factors, i.e., any transmission time differences may be insignificant for purposes of making the steering decisions.

An AP processing operation 28 may correspond with the APs making the contemplated steering decisions following exchange of the ACRs. One non-limiting aspect of the present invention contemplates each of the APs essentially simultaneously making their own steering decisions based on the ACRs provided from the other APs. This decision-making process may include the APs comparing the AP metrics to the client metrics for purposes of determining whether a client should be steered from one AP to another AP. The individuality of each AP making their own steering decision may be beneficial in avoiding situations where one AP controls or interferes with operations of the another AP in a manner that may harm its operation. To avoid inadvertently disassociating clients or undertaking other actions prior to availability of another AP, the steering decisions may be made in such a manner that the APs presume, even when steering thresholds are surpassed, that clients connected thereto are to remain connected until requested by another AP for steering. An AP (target AP) may request another AP (source AP) to steer a client thereto in response to making a steering decision that one or more clients of the source AP has surpassed a steering decision threshold warranting steering to the target AP. In the event another target AP also determines that a steering decision threshold warranting steering to the another target AP is surpassed, the source AP may then be responsible for deciding which one of the two target APs the client should be steered to, e.g., the client may be steered to the one of APs surpassing the threshold by the greatest amount or to the AP having the lowest MAC address or other arbitrator in the case of the threshold being surpassed equally, i.e., a tie.

Each of the APs within the Wi-Fi network may be considered as a target AP for any client disassociated therefrom such that each of those target APs may be responsible for individually determining whether the clients associated with another AP should be steered thereto. Making the steering decisions may require each AP to perform an iterative process whereby a steering decision is made for each client associated with another AP. In this manner and with respect to the exemplary illustration of FIG. 1, AP1 may be required to make steering decisions for clients A, B, C, D, E, F and G; AP2 may be required to make steering decisions for clients B, C, D, E, F and G; and AP3 may be required to make steering decisions for clients A and C. Client H is shown to be unassociated/unconnected with the APs and may be omitted from the steering decision processing until it associates with one of the APs. The presence of the unassociated client H may influence performance of the Wi-Fi network and information associated therewith may be included as part of the AP metrics and/or the client metrics, e.g., probes and other responses may be communicated from the unassociated client H and utilized to assess its presence and influence or potential influence on the Wi-Fi network. While the present invention contemplates ameliorating some of the decision-making processing by allowing a source AP to omit steering decisions for clients already associated therewith, the source APs may make steering decisions for associated/connected clients for purposes of generating trends, creating historical trends or for other reasons, such as to request another AP to accept one or more of its clients if the Wi-Fi network operates without the presumption that clients are to stay with a connected to AP until steering is requested by another AP.

The AP processing operation 28 may result in a decision to execute a steering operation whereupon each of the APs deciding to execute such a steering operation may commence a corresponding steering operation. While multiple APs may commence steering operations, FIG. 2 illustrates an exemplary steering operation 36 between AP2 and AP3, which may be characteristic of the operations associated with facilitating steering operations for any one of the other APs. When AP2 (target) decides that a client should be steered to it, it may send a steering request message 38 to AP3 (source) that the client is associated with. The source AP (AP3) may then respond with a steering response message 40 indicating whether or not it will steer the client to the target AP (AP2). To avoid an event where two target APs send a steering request message 38 for the same client to the source AP, the source AP may be required to wait a minimum of Y*X seconds to receive all steering request messages 38 from the time it receives the first steering request message 38, where Y is a multiplier and X is a frequency in which the ACRs are shared. Methods for steering the clients may include 802.11v BSS transition management or by disassociating a client and then Blacklisting (i.e. ignoring Probe Requests/Association Requests from a client) at the source AP. Both the source and target APs may tell each other all the steering methods they support within the shared ACRs so that the source AP can look at the supported steering methods of the target AP and choose the best method supported by both, which may be identified in the steering request message 38.

The source AP may receive multiple steering request messages 38 from different APs and assess those requests versus the ACRs to decide which request, or even none, it wants to grant. Optionally data included as part of the ACRs or the configuration parameters may dictate automatic action on the part of the source APs, such as by granting all steering requests, and/or including algorithms or other mechanisms for making decisions on whether to grant a steering request, such as by comparing target AP loading/airtime utilization and target AP viewed RSSI of client to thresholds defined relative to the source AP or other benchmarks. The target AP may be required to always send a steering result message 42 to the source AP, whether or not the steering is successful. If successful, the target AP may send the steering result message 42 as soon as the client associates to it with a result code indicating a success. If the client does not associate to the target AP within Z seconds, e.g., 10 seconds, of the target AP receiving the steering response message, the target AP may indicate a failure result code within the steering result message 42. The result may be used to tell the source AP if the client was successfully steered to the target AP or if the steering failed, which may be beneficial in enabling the source AP to ensure its associated client list is accurate as in some cases a source AP may think the client is still associated, i.e., on its client list, even after the client associates to another AP. The failure of the source AP to recognize a client has associated with another AP or should otherwise be omitted from its client list can be caused by the method in which the client leaves the source AP.

Figure 3:
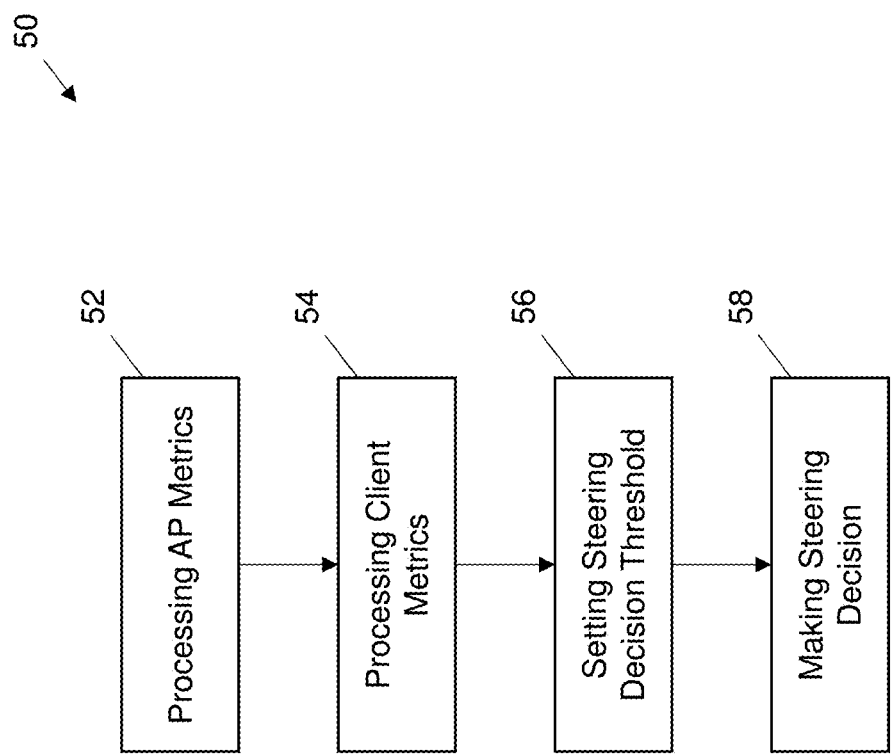
FIG. 3 illustrates a flowchart for a method of facilitating client steering in accordance with one non-limiting aspect of the present invention.

FIG. 3 illustrates a flowchart 50 for a method of facilitating client steering in accordance with one non-limiting aspect of the present invention. The client steering may correspond with AP-based decision-making processes executed as part of the above-described AP processing operation 28. The client steering may be individually performed at each of the APs of as a function of the ACR and/or other data available thereto and is described for exemplary non-limiting purposes with respect to being implemented in a manner whereby target APs request source APs to steer clients. The individual decisions being made by each of the APs to execute a steering operation may be facilitated with the non-transitory computer-readable mediums associated with each AP including corresponding instruction sufficient for executing or facilitating execution of the various operations contemplated herein. While the present invention is predominately described with respect to the client steering decisions being made individually at the APs, the present invention fully contemplates its use and application in other environments where a controller or other entity may be tasked with making similar decisions on behalf of the APs, such as when the networking environment is non-Wi-Fi or cellular and/or facilitated with a WLC.

Block 52 relates to the APs processing AP metrics included within the exchanged ACRs and/or otherwise available thereto. The AP metrics made generally relate to information representative of activities ongoing or capable of occurring at each of the APs. In the exemplary illustration of FIG. 1, AP1 one may process its own AP metrics as a well is that for AP2 and AP3 with the remaining APs similarly processing their own AP metrics as well as that of the other APs. One non-limiting aspect of the present invention contemplates demarcating AP metrics from client metrics based on how the data associated therewith may be used in making the contemplated steering decision, such as in the manner described in more detail below. While additional AP metrics may be utilized without deviating from the scope and contemplation of the present invention, the AP metrics are described herein for exemplary purposes to include a load cost, an airtime utilization (AU) cost and a distance cost whereby a summation of the cost may be used to a final AP cost. The final AP cost may be used to represent performance of one AP versus each of the other APs in a manner sufficient to assess the relative operation of each AP within the context of the multi-AP, Wi-Fi network environment where the activities of one AP may influence the operation of the other APs. The final AP cost, at least in this manner, may be beneficial in providing a benchmark to facilitate comparing the APs to each other.

One non-limiting aspect of the present invention contemplates normalizing the AP metrics relative to an integer scale such that values for each metric may be represented with an integer. One contemplated integer scale corresponds with normalizing the AP metrics to a one byte, unsigned integer value within an integer scale of 0-255. The use of such an integer scale may be beneficial in providing 255 levels of resolution while balancing the data processing and time associated with calculating the integers, i.e., one byte may be relatively easy to calculate and additional levels of resolution beyond 255 may be unlikely to provide sufficient differentiation to warrant use. To compensate for the possibility of one or more of the APs having capabilities of operating more than one radio, e.g., facilitating wireless signaling at 2.4 GHz and 5 GHz, the AP metrics may be related to each of the available or operating radios, or more particularly, the BSSs associated therewith. The load cost, the airtime utilization cost, the distance costs and/or other costs derived from the AP metrics may thereby be represented on a per BSS basis and with a corresponding value within the range of 0-255 so as to facilitate normalizing each value, i.e., each AP metric, to one another.

The load cost derived from the AP metrics may be expressed based on an agreed-upon or other maximum number of clients that a BSS can support, which for example may correspond with a 2.4 GHz BSS supporting a maximum of 16 clients and a 5.0 GHz BSS supporting a maximum of 32 clients. The load cost may be calculated as follows:

for 2.4 Ghz band–(sqrt(2)^x)–1,x=number of clients connected for 5.0 Ghz band–(4th root(2)^x)–1,x=number of clients connected The number of clients connected corresponds with the number of clients connected to a particular BSS of an AP such that the corresponding load cost represents a value for each BSS based on the number of connected clients. The illustrated formulas indicating the 2.4 GHz utilizing a square root and the 5.0 GHz utilizing a fourth square root to address throughput differences between 2.4 GHz and 5.0 GHz in a manner believed beneficial in relating AP loading when some APs may not include multiple radios or the capabilities to operate across multiple frequency bands.

The airtime utilization cost derived from the AP metrics may be expressed based on a percentage of airtime utilized over some agreed upon interval of time, which may be specified with AP coordination variables or otherwise established between the APs. The airtime utilization cost may, like the load cost, may be calculated on a per BSS basis as follows:

(2^x)–1,x=percentage of airtime utilization over time interval/10

One non-limiting aspect of the present invention contemplates operational constraints and other limitations resulting in the BSSs essentially maximizing airtime usage when airtime utilization is at 80% such that the above formula may generate an airtime utilization (AU) cost of 0 when the airtime utilization is 0%, e.g., AU cost equals 2^(0/10)–1, and an airtime utilization cost of 255 when the airtime utilization is 80%, e.g., AU cost equals 2^(80/10)–1.

The distance costs derived from the AP metrics may be expressed based on how far away the corresponding BSS is from the GW and calculated as follows:

(2^x)–1,x=distance.

One non-limiting aspect of the present invention contemplates selecting the distance to represent a number of hops from the GW of the corresponding BSS with a maximum number of hops being set to 8 such that the distance is represented with an integer between 0-8, e.g., 0 when the BSS is part of the GW, 1 when the BSS is the first AP from the GW (e.g., AP2) and 2 when the BSS is the second AP from the GW (e.g., AP3), etc. until a maximum value of 8. The contemplated use of integers between 0-8 is believed to be beneficial in addressing network topologies to represent costs associated with communicating data over the first LAN 12 based on travel distance to the GW. One non-limiting aspect of the present invention contemplates optionally weighting the distance cost based on other factors in addition to or in place of the number of hops from a GW to generate a value also representative of network topology and/or distance from a GW. These additional options may include: employing bandwidth, delay, wired and/or wireless backhaul connectivity to weight or adjust distance values to compensate for variations between hops and distance away from the gateway router. The number of hops to the gateway, throughput and delay of the connections may affect the distance cost analysis, e.g., wireless AP to AP connection could be 4 and wired connection can be 2 such that backhaul routing cost to send data between two APs maybe inversely proportional to the throughput between the APs. Optionally, if a link metric between all APs is known, those link metrics may be utilized as an alternative value for the distance x in the above calculation of the BSS distance cost, e.g. between AP1 and AP2 the metric may represent throughput (e.g., T12) such that the distance cost over this link may be 1/T12, which may be similarly summed or assessed for each other link between the AP and GW to generate the x value.

The final AP cost may be similarly determined on a per BSS basis as a summation of the corresponding load cost, airtime utilization cost and distance cost, optionally with those cost values being weighted according to selectable weightages to affect the influence thereof on the final AP cost calculation. The final AP cost may be calculated as follows:

((BSS load cost/weightage(a))+(BSS airtime utilization cost/weightage(b))+(BSS distance cost/weightage(c)))/number of metrics The foregoing demonstrates one non-limiting manner for calculating a final AP cost for each BSS with the individual values (metrics) being weighted prior to their summation. The weightages (e.g., a, b, c) may be selected on a per-BSS basis such that the weightages applied to one BSS may be different than those applied to another BSS, which may be beneficial in compensating for some BSSs having wide differences in operating capabilities, and/or the weightages may be applied equally to each of the individual cost metrics, i.e., each BSS being compared may have the corresponding metrics weighed with the same weightage to maintain consistency. The summation of the cost metrics may be divided by the total number of metrics being summed to keep the summation within the integer scale of 0-255 such that the number of metrics may change depending on whether more or less or different metrics are used than the exemplarily illustrated load, airtime utilization and distance costs.

One non-limiting aspect of the present invention contemplates selecting the weightages (e.g., a, b, c) for each of the integer values being weighted from a listing of weightages associated with a plurality of network performances. The network performances may relate to particular operating characteristics of the Wi-Fi network, such as to prioritize performance for video streaming over burst data transmissions for IoT devices. The weightages may be tabulated within a listing that cross-references the weightages to be used with each of the AP metrics for the corresponding network performance. The APs may coordinate to select the one of the plurality of network performances to be used in setting the weightages, which may optionally change over time or in response to historical behavior/needs of the Wi-Fi network. Testing of the present invention indicates empirically that a weightage value of 2 for the load cost, a weightage value of 6 for the distance cost and a weightage of 2 for the airtime utilization cost may maximize overall network performance for the given set of AP metrics.

Block 54 relates to each of the APs processing client metrics included within the exchanged ACRs and/or otherwise available thereto. The client metrics may be processed by the APs on a per client basis to relate a relative capability/cost for each client to communicate with each of the APs. One non-limiting aspect of the present invention contemplates the client metrics corresponding with a band cost and a signal-to-noise ratio (SNR) cost. The band cost and the SNR cost may be utilized to generate the final client cost normalized in the above-described manner with respect to the integer scale of 0-255 to provide a representable relationship to the final AP cost sufficient to facilitate making steering decisions.

The client band cost derived from the client metrics may be calculated to generate a factor for representing capabilities of each client to communicate with different radios, e.g., whether each client supports one or both of 2.4 GHz and 5.0 GHz communications. The client capability to communicate with different radios may then be related to one or more radios the client band associated with a particular BSS to provide an assessment of the client capabilities to communicate with that BSS. The client band cost may be calculated as follows:

If BSS band is 2.4 Ghz:
client supports only IEEE 802.11b/g: scale factor=1/4
client supports IEEE 802.11n: scale factor=1/2
client supports IEEE 802.11ac: scale factor=1
If BSS band is 5.0 Ghz:
client supports only IEEE 802.11b/g: scale factor=1
client supports IEEE 802.11n: scale factor=1/2
client supports IEEE 802.11ac: scale factor=1/4

The scale factor, e.g., 1, 1/2 and 1/4, used to represent the client band cost may be employed as described below to facilitate calculating the final client cost, which for exemplary purposes corresponds with determining the client cost as a scale factor instead of an integer within the 0-255 scale. The above formula notes the use of IEEE 802.11b/g, 802.11n and 802.11ac to represent client devices respectively having capabilities limited to 2.4 GHz communications (802.11b/g), capabilities for both 2.4 GHz and 5.0 GHz communications (802.11n) and capabilities limited to 5.0 GHz communications (802.11ac). The use of the IEEE designation is shown for exemplary non-limiting purposes as the present invention fully contemplates using other, such as IEEE 802.11ad for 60 GHz or other references suitable to demarcating available bandwidth capabilities of the clients.

The client signal-to-noise (SNR) cost derived from the client metrics may be generated to calculate an integer value sufficient for representing within the 0-255 scale how well each client can communicate with each BSS of the APs. The client SNR cost may be calculated as follows:

client SNR cost=-(RSSI+15)*3

The RSSI may correspond with a relative signal strength indicator (RSSI) utilized to represent relative signal strength between each client and each of the BSSs. A range for maximum and minimum RSSI values that a client may have may be set to [-15, -100] with -15 indicating the client to be very close and -100 indicating the client to be at a maximum distance. Optionally, actual SNR values may be normalized and utilized in place of the RSSI.

The final client cost derived from the client metrics may be calculated on a per BSS basis as follows:

client cost=client SNR cost*client band cost

The contemplated final client cost may be beneficial in providing an integer value within the range of 0-255 sufficient for balancing the communication capabilities of each client relative to each BSS, e.g., whether the client supports 2.4 GHz and/or 5.0 GHz communications, relative to signaling distance of the client to the corresponding BSS. While the use of additional client metrics in facilitating tabulation of the final client cost is foreseen, one non-limiting aspect of the present invention contemplates demarcating the AP metrics from the client metrics according to their use in calculating the final AP cost and the final client cost, i.e., the same metrics would not be used in both of the final AP cost and the final client cost, which may be beneficial in maximizing the integrity and independence of the cost calculations, particularly with respect to apportioning the influences to particular behaviors of the APs and the clients.

Block 56 relates to the APs setting a steering decision threshold to be used in making decisions as to whether a client steering operation should be instigated. One non-limiting aspect of the present invention contemplates the APs coordinating to set the steering decision threshold in a manner sufficient to assess whether a client currently connected to one BSS should be steered to another BSS. One contemplated strategy for setting the steering decision threshold based on the AP metrics may be as follows:

steering threshold=(final BSS cost for source AP)-(final BSS cost for target AP)

The steering threshold may be calculated on a per BSS basis by each of the APs with each AP iteratively performing the calculations as the source AP relative to each of the other APs being target APs. Optionally to limit hysteresis or clients switching too frequently, the difference in the final cost between two APs may need to be at least greater than a predefined hysteresis value (e.g., 20).

Block 58 relates to the APs making steering decision based on whether individual clients exceed the steering threshold associated therewith. The steering threshold may be based on a client switching from a source AP to a target AP such that the corresponding steering decision may be based on whether a difference between the client's performance at the BSS of the source AP and that same client's performance at the BSS of the target AP is sufficient to warrant executing a steering operation to steer the client from the source AP to the target AP. One contemplated strategy for making the steering decision based on the client metrics may be as follows:

steer if ((final client cost for source BSS)-(final client cost for target BSS))>(maximum of (steering decision threshold and hysteresis value))

A greater steering threshold occurs when the AP metrics indicate the BSS of the target AP to be more loaded than the source AP and/or if the BSS of the target AP has a greater airtime utilization or distance cost such that the client's performance, if switched to the target AP, must be sufficient to justify the corresponding steering operation. The steering threshold cost, or in other words the difference between client performance at one BSS in comparison to another BSS, can be adjusted up or down depending on desired influences, e.g., rather than using the noted threshold a weightage may be applied to increase or decrease the corresponding value. The weightage for example may decrease the threshold when it may be desirable to reduce the influence of BSS cost versus client cost in the weightage may be increased to increase the influence of BSS cost versus client cost. The plurality of network parameters utilized to facilitate selection of the way the weightages optional utilize when regulating the final BSS cost may include values for selecting weightages to be applied to the steering decision threshold.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for facilitating steering of a client within a wireless network having a plurality of access points (APs), the method comprising:
   determining AP metrics for the APs;
   determining client metrics for the client;
   setting a steering decision threshold based on the AP metrics;
   making a steering decision for the client based on whether the client metrics exceed the steering decision threshold;
   generating an AP cost for each of the APs, the AP cost being a summation of values associated with the AP metrics of the AP corresponding therewith; and
   generating the steering decision threshold to equal a difference between the AP cost for two of the APs.

2. The method of claim 1 further comprising
   determining the client metrics to include at least one metric different than the AP metrics; and
   normalizing the AP metrics relative to an integer scale, the normalizing resulting in each of the AP metrics being individually represented with an integer, including setting the integer scale such that each of the integers are individually representable with a single byte and such that each of the integers occur between 0 and 255.

3. The method of claim 1 further comprising:
   generating a client cost value based on the client metrics; and
   determining the client metrics exceed the steering decision threshold when the client cost value is greater than the AP cost value.

4. The method of claim 3 further comprising weighting one or more of the values prior to the summation, the weighting being sufficient to increase or decrease an influence of the corresponding AP metric when generating the steering decision.

5. The method of claim 4 further comprising:
   determining a desired network performance for the wireless network; and
   selecting weightages for each of the one or more values to be weighted, including selecting the weightages from a listing of weightages associated with a plurality of network performances, the selected weightages corresponding with the weightages in the listing associated with a one of the plurality of network performances matching the desired network performance.

6. The method of claim 1 further comprising:
   summing the AP metrics for a first AP of the APs to generate a first AP cost;
   summing the AP metrics for a second AP of the APs to generate a second AP cost;
   setting the steering decision threshold to equal the second AP cost minus the first AP cost;
   summing the client metrics to generate a client cost; and
   determining the client metrics exceed the steering decision threshold when the client cost is greater than the steering decision threshold.

7. The method of claim 6 further comprising executing a steering operation when the client metrics exceed the steering decision threshold, the steering operation resulting in the client disassociating from the first AP and subsequently associating with the second AP.

8. The method of claim 7 further comprising:
   receiving a first report at the second AP, the first report including the AP metrics for the first APs;
   summing the AP metrics for the first AP and the second AP at the second AP following receipt of the first report thereat;
   receiving a client report at the second AP, the client report including the client metrics for the client;
   summing the client metrics at the second AP following receipt of the client report thereat; and
   instigating the steering operation with transmission of a steering request message from the second AP to the first AP.

9. The method of claim 1 further comprising executing the steering decision without exposing the AP metrics to the client.

10. The method of claim 8 further comprising transmitting the steering request message from the second AP to the first AP over a backhaul network operating independently of the wireless network, the client lacking access to the backhaul network such that the client is unable to access the steering request message when transmitted from the second AP to the first AP.

11. The method of claim 10 further comprising determining the AP metrics from information included in one or more associated client reports (ACRs) transmitted over the backhaul network from each of the plurality of access points.

12. The method of claim 8 further comprising transmitting a steering result message from the second AP to the first AP following association of the client with the second AP, the steering result message instructing the first AP to remove the client from a client list of the first AP.

13. The method of claim 1 further comprising:
   calculating the AP metrics for a first AP of the APs to generate a first AP cost;
   calculating the AP metrics for a second AP of the APs to generate a second AP cost;
   setting the steering decision threshold to equal the second AP cost minus the first AP cost; and
   determining the client exceeds the steering decision threshold when the client metrics are greater than the steering decision threshold.

14. The method of claim 1 further comprising:
   determining the AP metrics to include a load cost, an airtime utilization (AU) cost and a distance cost;
   determining the client metrics to include a band cost and a signal-to-noise ratio (SNR) cost;
   setting the steering decision threshold based at least partially on one of the load cost, the AU cost and the distance cost; and
   making the steering decision based at least partially on one of the band cost and the SNR cost.

15. A method for supporting a first access point (AP), the first AP being one a plurality of APs coordinating to support a wireless network, the method comprising:
   determining AP metrics for the plurality of APs;
   determining client metrics for a client associated with a second AP of the plurality of APs;
   setting a steering decision threshold based on a difference between the AP metrics of the first AP and the AP metrics of the second AP;
   implementing an AP-based steering decision by requesting the second AP to steer the client to the first AP when the client metrics exceed the steering decision threshold; and
   preventing the client from implementing a client-based steering decision when throughput of the wireless network fails to exceed a throughput threshold or when a quantity of clients accessing the wireless network fails to be less than an access threshold.

16. The method of claim 15 further comprising:
determining the AP metrics from information included in one or more associated client reports (ACRs) transmitted from each of the plurality of APs;
transmission of a steering request message from the first AP to the second AP to implement the AP-based steering decision; and
transmitting a steering result message from the first AP to the second AP following association of the client with the first AP, the steering result message instructing the second AP to remove the client from a client list of the second AP.

17. The method of claim 15 further comprising preventing the client from using the AP metrics when implementing the client-based steering decision.

18. A method for supporting a first access point (AP), the first AP being one a plurality of APs coordinating to support a wireless network, the method comprising:
determining AP metrics for the plurality of APs;
determining a difference between the AP metrics of the first AP and the AP metrics of a second AP;
determining a hysteresis value; and
setting a steering decision threshold equal to:
i) the difference when the difference is greater than the hysteresis value; and
ii) the hysteresis value when the difference fails to be greater than the hysteresis value.

\* \* \* \* \*